Patented Oct. 9, 1945

2,386,375

UNITED STATES PATENT OFFICE 2,386,375

PROCESS FOR SEPARATING HYDROCARBONS

Charles E. Welling, Bartlesville, Okla., assignor to Phillips Petroleum Company, a corporation of Delaware No Drawing. Application April 6, 1942, Serial No. 437,905

4 Claims. (Cl. 202—42)

This invention relates to the concentration and separation of hydrocarbons containing five or six carbon atoms, particularly paraffins, olefins, di-olefins, and cyclo-olefins, from hydrocarbon mixtures containing the same. More particularly, this invention relates to the use of propylene oxide to render such concentration and/or separation by fractional distillation much more practical and feasible than by simple fractional distillation of the hydrocarbon mixture alone.

Large quantities of various complex hydrocarbon mixtures containing different hydrocarbon types such as paraffins, olefins, di-olefins, cyclo-olefins, etc., result from various industrial processes such as the cracking of petroleum fractions. Such mixtures are customarily subjected to fractional distillation when it is desired to effect some separation of the different hydrocarbons present. Such a procedure is usually satisfactory for separating a mixture into various fractions, each of which will contain hydrocarbons having boiling points relatively close together. However, it often happens that it is desirable to separate into portions containing only one hydrocarbon type for further processing, a mixture such as a fraction from a fractional distillation like that mentioned above. The difficulty in separating such close-boiling mixtures by conventional fractional distillation is well known and it is recognized that frequently in cases where the different types of hydrocarbon have the same or nearly the same boiling point that little if any separation of the hydrocarbons may be effected by conventional fractional distillation.

It is an object of this invention to provide a process for the separation of mixtures containing 5- or 6-carbon atom hydrocarbons into fractions enriched in one or more different types of hydrocarbons. Another object is to provide a specific entraining agent, propylene oxide, for use in the distillation of such hydrocarbon mixtures to aid in the separation of the different types of hydrocarbons one from the other. A further object is to provide a method for separation by azeotropic distillation of paraffins, olefins, diolefins, and/or cyclo-olefins having 5 or 6 carbon atoms per molecule from mixtures of two or more of such hydrocarbons having relatively close boiling points, whereby one or more of the different hydrocarbons may be concentrated, or separated in substantially pure form. A further object is to provide a process especially suitable for the preparation of substantially pure pentadienes and hexadienes. Another object is to provide for the separation of a constant boiling mixture of piperylene and cyclo-pentene into its components. Other objects and advantages will become apparent from the following detailed description.

My invention is a process for the separation of hydrocarbons having five or six carbon atoms to the molecule by fractionally distilling mixtures containing these hydrocarbons in the presence of propylene oxide, which forms minimum-boiling azeotropic mixtures with individual hydrocarbons in the mixture. In general, I have found that the addition of proylene oxide to a mixture of close-boiling 5- or 6-carbon atom hydrocarbons results in an apparent increase in volatility of the more saturated as compared to the more unsaturated materials, and upon fractionation the former tend to be concentrated in the overhead product and the latter in the kettle product. In fact, I may, if desired, separate out one or more substantially pure individual hydrocarbons, by the practice of my invention. The separation of pure diolefins having five or six carbon atoms per molecule is of especial advantage, in that said separation is exceptionally difficult to make, especially from admixture with olefins and cyclo-olefins.

I generally prefer to apply this process to $C_5$ or $C_6$ hydrocarbon mixtures of relatively narrow boiling range, such as may be obtained by a preliminary fractionation or otherwise, which will normally contain one or more close-boiling cyclo-olefin, diolefin, olefin, and/or paraffin hydrocarbons. Such hydrocarbon mixtures should not contain more than minor amounts of the most saturated hydrocarbons boiling more than 5 to 10° F. higher than the boiling point of the lowest-boiling most unsaturated hydrocarbon contained in the mixture and which it is desired to concentrate in the kettle product. For example, the efficiency of my process would be decreased by the presence of any considerable amounts of olefin hydrocarbons with boiling points more than 5 to 10° F. higher than the boiling point of the lowest-boiling diolefin which it is desired to concentrate. No such limitation as the above applies to more saturated hydrocarbons boiling below the diolefin in question; a rather wide range of boiling points below that of the most unsaturated hydrocarbon is permissible. Were I to apply my process to a close-boiling hydrocarbon mixture containing paraffinic, olefinic, diolefinic and/or cyclo-olefinic materials as the major constituents and minor amounts of other materials having a high carbon to hydrogen ratio, such as acetylenes or benzene, then in making the separations there would generally be a tendency to concentrate those materials having a high carbon to hydrogen ratio in the kettle product.

Specific examples of my process which illustrate its superiority over simple fractional distillation are as follows:

EXAMPLE 1

A mixture of very close-boiling olefinic and paraffinic materials was prepared by blending together 117 cc. of pentene-2 (sp. gr. 20/20, 0.6508; $n_D^{20}$, 1.3797) and 160 cc. n-pentane (sp. gr. 20/20, 0.6269; $n_D^{20}$, 1.3570). Physical properties of the paraffin-olefin mixture so produced were: sp. g. 20/20, 0.6365; $n_D^{20}$, 1.3664. The pentene-2 fraction so used was a mixture of the geometric isomers of pentene-2, one of which boils slightly below n-pentane while the other boils slightly above n-pentane. The properties of pure n-pentane and of the pentene-2 isomers as reported by Egloff (Physical Constants of Hydrocarbons, vol. I (1939), Reinhold Publishing Corporation) are listed in Table I.

TABLE I

*Physical properties*

| | Boiling point (760 mm. Hg), °C. | $n_D^{20}$ | Sp. gr. $\frac{20}{20}$ (calculated from $d_4^{20}$) |
|---|---|---|---|
| n-Pentane | 36.08 | 1.35768 | 0.6275 |
| Pentene-2 (low boiling) | 35.85 | 1.3792 | 0.6493 |
| Pentene-2 (high boiling) | 37 | 1.38130 | 0.6514 |

To the mixture of n-pentane and pentene-2, prepared as described above, there was added slightly more than an equal volume of propylene oxide and this mixture was subjected to batch fractionation in a column packed to a height of 120 cm. with $\frac{1}{8}$ inch diameter single-turn wire helices. The column was operated at atmospheric pressure and with a reflux ratio that varied between 30:1 and 55:1. The results of the fractionation are shown in Table II below. The amounts, refractive indices, and estimated purities of the various fractions, as shown in the table, refer to the hydrocarbons recovered after removing propylene oxide by water washing.

TABLE II

*Separation of n-pentane and pentenes-2 by azeotropic fractionation with propylene oxide*

| Fraction | Boiling range corrected to 760 mm. Hg, °C. | Propylene oxide in overhead, vol. percent | Vol. percent of charge | Cumul. vol. percent of charge | Sp. gr. $\frac{20}{20}$ | $n_D^{20}$ | Est'd percent olefin by $n_D^{20}$ | Olefin by bromine titration, percent |
|---|---|---|---|---|---|---|---|---|
| 1 | 27.4–27.7 | 50 | 4.7 | 4.7 | 0.6270 | 1.3580 | 4.5 | <0.5 |
| 2 | 27.7–27.8 | 46 | 7.8 | 12.5 | 0.6274 | 1.3575 | 2 | <0.5 |
| 3 | 27.8 | 50 | 10.8 | 23.3 | 0.6277 | 1.3580 | 4.5 | |
| 4 | 27.8 | 45 | 10.1 | 33.4 | 0.6276 | 1.3582 | 5 | |
| 5 | 27.8–28.0 | 46 | 8.8 | 42.2 | 0.6289 | 1.3596 | 11 | |
| 6 | 28.0–29.0 | 45 | 7.9 | 50.1 | 0.6317 | 1.3622 | 23 | |
| 7 | 29.0–30.3 | 48 | 7.8 | 57.9 | 0.6458 | 1.3758 | 80–82 | |
| 8 | 30.0–30.3 | 47 | 6.9 | 64.8 | 0.6499 | 1.3792 | >95 | |
| Kettle | | | 18 | 82.8 | 0.6511 | 1.3804 | >95 | |
| Loss in distillation and in washing samples | | | 17.2 | 100.0 | | | | |

It will be noted that an extremely efficient paraffin-olefin separation was made, according to Table II. Such a separation would be virtually impossible to attain by a singel convertional fractional distillation, since the boiling point differences are very small and because of the order of the boiling points for the compounds involved. The efficacy of my process, as embodied in this example, is self-evident.

EXAMPLE 2

A commercial isoprene concentrate containing 65 to 70 per cent isoprene along with close-boiling olefins, principally 2-methyl-1-butene and pentenes-2, and having a refractive index $n_D^{20}$ of 1.4085, was subjected to conventional fractionation in a column of 1.2 cm. inside diameter packed to a height of 90 cm. with $\frac{1}{8}$ inch diameter single turn wire helices. A reflux ratio of 50:1 was used. Results of the fractionation are given in Table III.

TABLE III

*Conventional fractionation of an isoprene concentrate*

| Fraction | Boiling range corrected to 760 mm. Hg, °C. | Vol. per cent of charge | Cumul. vol. per cent of charge | $n_D^{20}$ | Per cent isoprene in fraction by $n_D^{20}$ |
|---|---|---|---|---|---|
| 1 | 30.8–32.4 | 9.5 | 9.5 | 1.3920 | [1] ~30 |
| 2 | 32.4–33.5 | 11.3 | 20.8 | 1.4061 | [1] 65 |
| 3 | 33.5–33.7 | 6.5 | 27.3 | 1.4120 | [1] 78 |
| 4[2] | 33.7–34.9 | 5.8 | 33.1 | 1.4152 | [1] 85 |
| 5[2] | 34.2–34.7 | 5.1 | 38.2 | 1.4160 | [1] 87 |
| 6[2] | 34.7–34.1 | 10.0 | 48.2 | 1.4154 | [1] 86 |
| 7 | 34.1–34.3 | 8.8 | 57.0 | 1.4148 | [1] 84 |
| 8 | 34.3–34.4 | 7.0 | 64.0 | 1.4140 | [1] 82 |
| 9 | 34.4–34.9 | 8.0 | 72.0 | 1.4088 | [3] 69 |
| 10 | 34.9–36.3 | 6.9 | 78.9 | 1.3951 | [3] 36 |
| 11 | 36.3–37.7 | 7.0 | 85.9 | 1.3842 | ~0 |
| Kettle | | 9.3 | 95.2 | [4] 1.4190 | |
| Loss | | 4.8 | 100.0 | | |

[1] Components assumed present in calculating purity were isoprene and 2-methyl-1-butene.
[2] Temperatures are inaccurate because of back pressure that developed in the column and pinching-off of cooling water to the reflux condenser.
[3] Components assumed present in calculating purity were isoprene and pentene-2.
[4] Probably small amounts of cyclopentadiene or piperylene were present.

Examination of Table III shows that the purest 2-methyl-1-butene obtained was about 70 per cent olefin and the purest isoprene obtained was 87 per cent diolefin.

An isoprene concentrate similar to that fractionated above but having a somewhat narrower boiling range and a little less isoprene, had a refractive index $n_D^{20}$ of 1.4060 and contained about 64 per cent isoprene. Ninety volumes of this material was mixed with 125 volumes of propylene oxide and charged to the same column as used in the straight fractionation described in Table III. A reflux ratio of 50:1 was used. Results of this fractionation are given in Table IV. The amounts, refractive indices, and estimated purities of the various fractions, as shown in the table, refer to the hydrocarbons recovered after removing propylene oxide by water washing.

TABLE IV

Separation of isoprene and 2-methyl-1-butene by azeotropic fractionation with propylene oxide

| Fraction | Boiling range corrected to 760 mm. Hg, °C. | Propylene oxide in overhead vol., percent | Vol. percent of charge | Cumul. vol. percent of charge | $n_D^{10}$ | Percent isoprene in fraction by $n_D^{10}$ |
|---|---|---|---|---|---|---|
| 1 | 26.8–27.8 | 40.8 | 14.5 | 14.5 | 1.3764 | <5 |
| 2 | 27.8–30.4 | 44.4 | 11.1 | 25.6 | 1.3885 | [1] 24 |
| 3 | 30.4–31.2 | 48.8 | 10.2 | 35.8 | 1.4162 | [1] 88 |
| 4 | 31.2–31.4 | 50.3 | 10.2 | 46.0 | 1.4184 | [1] 93 |
| 5 | 31.4–31.5 | 55.3 | 7.5 | 53.5 | 1.4208 | [1] 98 |
| 6 | 31.5–31.6 | 61.3 | 9.5 | 63.0 | 1.4213 | [1] 99 |
| 7 | 31.6–31.75 | 55.7 | 8.9 | 71.9 | 1.4215 | [1] 100 |
| 8 | [2] 31.75–34.1 | 84.6 | 2.2 | 74.1 | | |
| Loss in distillation and in washing out entrainer | | | 25.9 | 100.0 | | |

[1] Components assumed to be present in calculating purity were isoprene and 2-methyl-1-butene.
[2] The hydrocarbons had been largely exhausted from the column at this point.

Examination of Table IV shows that olefin of better than 95 per cent purity was obtained and isoprene of 98 to 100 per cent purity was recovered. In fact, in addition to any isoprene lost in the distillation and washing, 39 per cent of the isoprene charged was recovered in 98 to 100 per cent purity. Thus, separation of substantially pure isoprene, as well as other pentadienes and hexadienes, may be accomplished through practice of this invention.

EXAMPLE 3

A closely fractionated cut of so-called aromatic oils obtained from petroleum cracking operations had the following properties: boiling range (760 mm.), 43.7–44.2° C.; specific gravity (20/20), 0.7473. This material was essentially a binary mixture of cyclopentene and high-boiling piperylene that contained 65 to 70 per cent cyclopentene. Since the normal boiling points of these hydrocarbons are less than 0.5° C. apart, their mixtures are not amenable to separation by straight fractionation. To a 125 cc. portion of this material there was added 235 cc. of propylene oxide, and the mixture was fractionated at atmospheric pressure in a glass column of 1.0 cm. inside diameter packed to a height of 90 cm. with $\frac{1}{16}$ inch single turn wire helices. The column was operated at a reflux ratio of 70:1. A total of 46 cc. of cyclopentene was recovered from the overhead distillate in 97–98 per cent purity (sp. gr. (20/20), 0.7712 to 0.7722). Since no practical separation of the components of the original material could have been obtained by conventional fractionation, it can be seen that a very great improvement in separation resulted from the use of propylene oxide in the fractionation.

I generally prefer to carry out my process at temperatures varying from about 70° F. to about 150° F. and at pressures from about atmospheric to pressures of about two atmospheres, absolute. It is usually convenient to operate at or slightly above atmospheric pressure. However, the distillations may also be carried out at lower or higher temperatures and pressures if desired.

It is desirable to operate my process at as low a temperature in the kettle and throughout the column as is convenient; propylene oxide has a slight tendency toward decomposition or degradation upon heating and this tendency may be minimized by keeping the temperature at a low level.

While the examples cited of my process were batch-wise fractional distillations of hydrocarbon mixtures with propylene oxide, my process is equally applicable to continuous fractionation. In case continuous fractionation is employed, the hydrocarbon mixture is continuously charged to the fractionating column at some point along the column and the propylene oxide added at the same point or some other point or points along the column. In such a continuous fractionation involving, for example, paraffins and olefins and perhaps diolefins, diolefinic and/or olefinic materials are ordinarily removed from the kettle of the column with or without propylene oxide and azeotropic mixtures of paraffins and/or olefins present together with propylene oxide are taken off the top of the column. The hydrocarbons removed from the column kettle may or may not contain substantial amounts of propylene oxide, depending upon the relative amounts of propylene oxide and hydrocarbon mixtures charged to the column. My process may be operated with any desired ratio of propylene oxide to hydrocarbon mixture that is equal to or greater than a minimum ratio which will be determined by the amount of entrainer required to form azeotropic mixtures with the hydrocarbons which are to be distilled overhead.

In operating my process, I use any convenient method of removing propylene oxide from the products of the fractionation, such as water washing. The materials removed as a kettle product will contain any high-boiling materials that may result from degradation or decomposition of a part of the entrainer. Such high-boiling materials may not always be water soluble and hence not removed by water washing of the kettle product as is the propylene oxide. In such a case it may sometimes be necessary first to water wash the kettle product to remove all water-soluble material and then to free the hydrocarbon product of high-boiling materials by distillation in auxiliary equipment.

In addition to the separation of paraffins from close-boiling olefins and/or diolefins, of olefins from diolefins, of cyclo-olefins from diolefins, etc., this invention may be used for such separations as cyclo-olefins from cyclodiolefins, cyclohexanes and cyclohexenes from benzene, etc. It may also be used for the separation of cycloparaffins from cyclo-olefins and/or cyclodiolefins but ordinarily such separation can be effected by simple or conventional fractionation because of the relatively large difference in boiling points. While the examples given show specifically the separation of $C_5$ paraffins, olefins, diolefins, and cyclo-olefins, I may, as heretofore stated, use propylene oxide to accomplish similar separations of $C_6$ hydrocarbons, such as, for example, n-hexane, 2-methyl pentane, hexene-2, 2,3-dimethyl butadiene-1,3, etc., one from another. I have found that mixtures of such $C_6$ hydrocarbons lend themselves readily to azeotropic distillation with propylene oxide since good separations may be obtained thereby, where separation by conventional fractionation is impossible due to the closeness of boiling points and complexity of mixtures.

Since the invention may be practiced otherwise than as specifically described, and since many variations and modifications of it will be obvious to those skilled in the art, it should not be limited except as specified in the appended claims.

I claim:

1. A process for the separation of piperylene from a mixture of close-boiling $C_5$ hydrocarbons comprising cyclopentene which comprises fractionally distilling said mixture in the presence of propylene oxide as an azeotropic entraining agent in amount sufficient to form minimum boiling azeotrope with cyclopentene, taking overhead cyclopentene and propylene oxide in azeotrope proportions and thereby concentrating the piperylene in the kettle product.

2. A process for the separation of piperylene from a mixture of close-boiling pentenes comprising cyclopentene which comprises fractionally distilling the mixture in the presence of propylene oxide in an amount sufficient to form azeotropic mixture with all of said pentenes, and removing said azeotropic mixture of propylene oxide with said pentenes overhead and thereby concentrating piperylene in the kettle product.

3. A process for the separation of piperylene from admixture with cyclopentene which comprises fractionally distilling the mixture of piperylene and cyclopentene in the presence of propylene oxide as an azeotropic forming agent in an amount sufficient to form a minimum boiling azeotrope with the cyclopentene in said mixture, taking overhead a fraction composed of the cyclopentene content of said mixture and propylene oxide in azeotrope-forming proportions and thereby concentrating the piperylene content of said mixture in the kettle product.

4. A process for the separation of piperylene from a mixture of piperylene and cyclopentene which comprises fractionally distilling said mixture in the presence of propylene oxide in amount sufficient to form an azeotropic mixture with all of said cyclopentene, and removing said azeotropic mixture of propylene oxide with cyclopentene overhead and thereby concentrating said piperylene in the kettle product.

CHARLES E. WELLING.